(12) United States Patent
Griffin et al.

(10) Patent No.: US 6,531,850 B1
(45) Date of Patent: Mar. 11, 2003

(54) LOAD CONTROLLER UTILIZING ALTERNATOR FIELD EXCITATION

(75) Inventors: Randall John Griffin, Erwin, NC (US); Brent Rinholm, Fuquay-Varina, NC (US)

(73) Assignee: Deere & Company, Moline, IL (US)

( * ) Notice: Subject to any disclaimer, the term of this patent is extended or adjusted under 35 U.S.C. 154(b) by 25 days.

(21) Appl. No.: 09/933,223

(22) Filed: Aug. 20, 2001

(51) Int. Cl.[7] ................................................ H02P 9/00
(52) U.S. Cl. .................................... 322/28; 322/27
(58) Field of Search .................... 290/38, 44, 40 C; 322/26, 27, 28, 29

(56) References Cited

U.S. PATENT DOCUMENTS

| 4,146,264 A | 3/1979 | Korzeniewski | 290/44 |
|---|---|---|---|
| 4,346,337 A | 8/1982 | Watrous | 322/25 |
| 5,107,098 A * | 4/1992 | D'Auria | 219/548 |
| 5,432,413 A | 7/1995 | Duke et al. | 318/139 |
| 5,506,492 A | 4/1996 | Harris | 322/28 |
| 5,631,543 A * | 5/1997 | Watson | 322/27 |
| 5,656,922 A * | 8/1997 | LaVelle et al. | 322/46 |
| 5,719,485 A | 2/1998 | Asada | 322/28 |
| 6,111,768 A | 8/2000 | Curtiss | 363/98 |
| 6,275,012 B1 * | 8/2001 | Jabaji | 322/22 |
| 6,469,476 B1 * | 10/2002 | Barrett et al. | 322/29 |
| 2002/0163321 A1 * | 11/2002 | Harmon | 322/28 |

* cited by examiner

Primary Examiner—Nicholas Ponomarenko

(57) ABSTRACT

A DC motor control for an electrical implement such as a reel mower includes a regulator having additional inputs connected to a main intelligent control which includes interlock circuitry. The additional inputs provide both an on/off or voltage select function and an interlock function. A low cost and low current field regulator circuit provides switching and load control and eliminates high inrush currents and voltage and current transients. On/off functions and level control functions can be provided from a logic level signal, and the motors can be started smoothly by bringing the voltage up gradually.

7 Claims, 1 Drawing Sheet

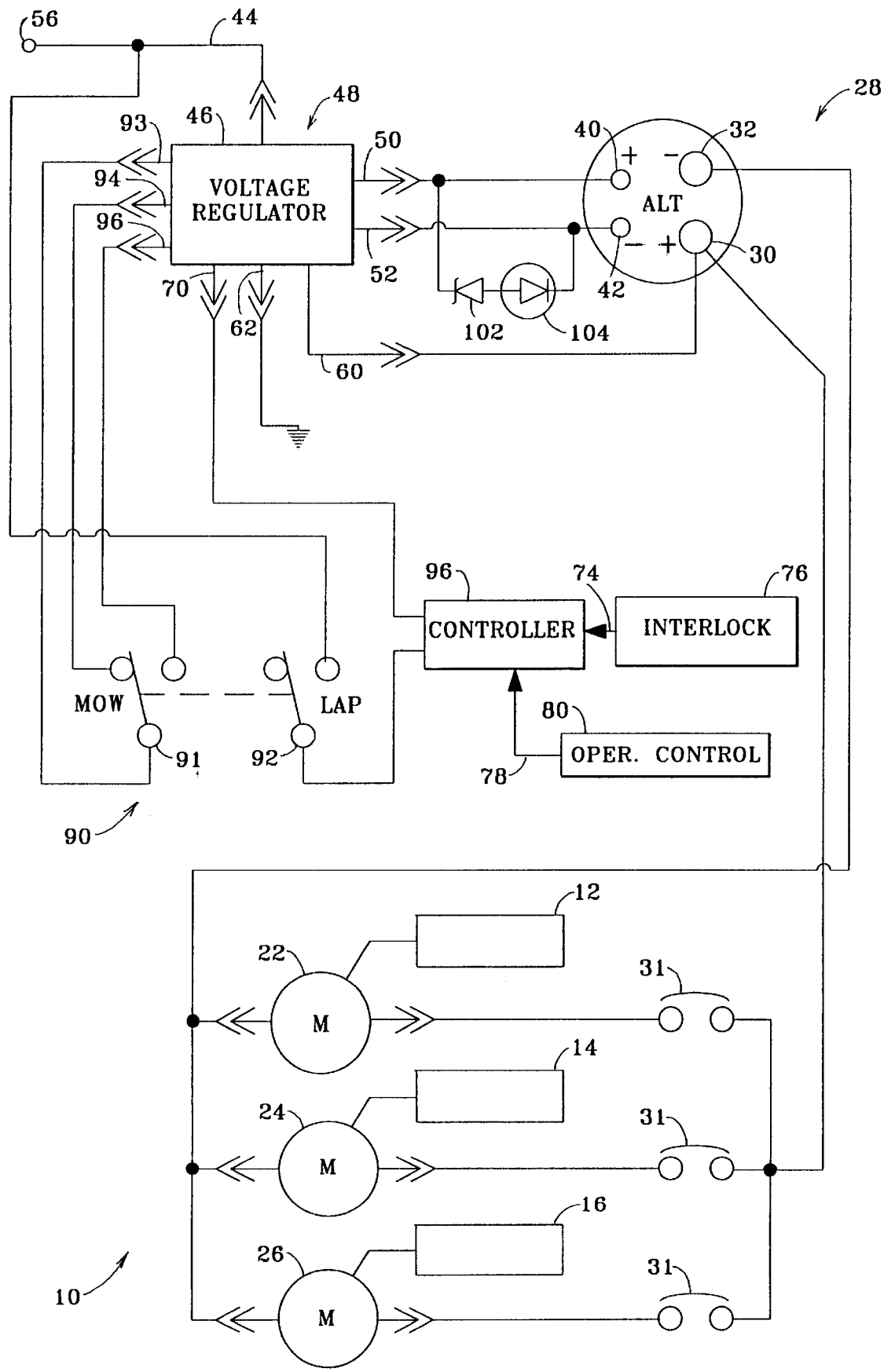

LOAD CONTROLLER UTILIZING ALTERNATOR FIELD EXCITATION

FIELD OF THE INVENTION

The present invention relates generally to electrically driven implements such as mowers, and, more specifically, to a circuit for switching and adjusting high currents to the motors of such implements.

BACKGROUND OF THE INVENTION

Electrically driven implements such as reel-type lawn mowers are becoming increasingly popular. Switching the motors on and off and controlling the relatively high currents to such motors is a continuing source of problems. Expensive controllers are required to handle the high inrush current and the high voltage transients that are created when current is interrupted. Systems utilizing contact or transistor DC switching are subject to arcing and high voltage transients and associated RFI problems. Such systems are also difficult to control to maintain a constant speed and/or voltage output. In the hostile environment encountered by a typical high current draw implement such as an electrically driven mower or similar implement, the problems become particularly acute. Smooth or "soft" starting of the controlled motors is difficult or impossible to achieve with at least most presently available systems.

SUMMARY OF THE INVENTION

It is therefore an object of the present invention to provide an improved control system for electrically driven implements. It is a further object to provide such a system which overcomes most or all of the aforementioned problems.

It is another object of the present invention to provide an improved control system for electrically driven implements which is less expensive and more reliable than at least most previously available systems. It is a further object to provide such a system which reduces or eliminates arcing and radio interference problems typically associated with high current DC switching.

It is still another object of the present invention to provide an improved control system for an electrically driven implement which is low in cost, eliminates high current switching problems and facilitates smooth, gradual starting of the electrical motors. It is another object to provide such a system which eliminates the need for high current contact or switching transistors and which can be controlled from a relatively low level logic signal or can be ramped up and down without subjecting the system to arcing and RFI problems.

It is a further object of the invention to provide an improved DC motor load controller for an implement utilizing control of the alternator field to control alternator output for switching and voltage control. It is a further object to provide such a system wherein the field control is also responsive to interlocks on the implement.

A load controller constructed in accordance with the teachings of the present invention includes an alternator with a field regulator having additional inputs connected to a main intelligent control which includes interlock circuitry. The additional inputs provide both an on/off or voltage select function and an interlock function. Relatively high current load motors, such as mower reel drive motors, are connected to the alternator output. Rather than utilizing expensive contact or switching transistors for directly switching and adjusting high current loads at the alternator output, a lower cost and lower current field regulator circuit provides switching and load control and eliminates high inrush currents and current and high voltage transients. On/off functions and level control functions therefore can be provided from a logic level signal, and the motors can be started smoothly by bringing the voltage up gradually. The system eliminates arcing and RFI problems associated with such arcing. The interlock input function input helps integrate the implement system for convenient, reliable and low cost control.

BRIEF DESCRIPTION OF THE DRAWINGS

The single drawing FIGURE shows an electrical control circuit for an electric reel mower.

DESCRIPTION OF THE PREFERRED EMBODIMENT

Referring now to the drawing FIGURE, therein is shown a portion of an implement 10 having working elements 12, 14 and 16 driven by electrical motors 22, 24 and 26, respectively. As shown, the implement 10 is an electric reel greens mower and the working elements 12, 14 and 16 are cutting reels, but it is to be understood that the present control system may be utilized with other types of electrically driven implements.

The electrical motors 22, 24 and 26 are powered directly by an engine driven alternator system indicated generally at 28 having a positive output terminal 30 connected via high amperage fuses 31 to first input terminals on the motors 22, 24 and 26. Second terminals on the motors 22–26 are connected to a negative terminal 32 on the alternator system 28.

The alternator system 28 includes a positive field input terminal 40 and a negative field input terminal 42 connected to a voltage regulator 46 of a regulator system 48 via inputs 50 and 52. Field excitation of the alternator system 28 is controlled to turn the output voltage between terminals 30 and 32 on and off and to vary the output voltage between the terminals. The regulator system 48 is connected to a source of DC voltage 56 on the implement. The voltage of the source 56 is preferably substantially less than and independent of the system 28 and is on the order of twelve volts.

A voltage sensing line 60 is connected between the regulator 46 and the positive output terminal 30, and a regulator terminal 62 is connected to ground. In addition to standard regulator control inputs, the regulator 48 includes a control input 70 connected to a main electronic intelligent control 72 to provide on/off and voltage select functions. The intelligent control 72 receives input signals via lines 74 from interlocks 76 on the implement 10. The interlocks 76 are conventional switches or the like providing signals indicative of conditions on the implement, such as operator presence, brake position, gear position, start condition, tool position and the like.

Operator control inputs are provided to the control 72 via lines 78 from an operator control interface 80. The operator can select various motor control variables such as on/off functions, desired reel speed, and start-up time for smooth starting the motors 22, 24 and 26.

A mow/lap control switch 90 includes a first input terminal 91 connected to the regulator 46 and second input terminal 92 connected to the control 72. In the mow position (shown), terminal inputs 93 and 94 to the regulator 46 are connected to each other, and the terminal 92 is open. In the lap position, source voltage is applied to a control input 96 of the control 96, and the terminal 93 is connected to a terminal 96 of the regulator 46. When the switch 90 is moved to the lap position, the control 72 is responsive to a high level at the control input and maintains field excitation at a low level to operate the motors 22, 24 and 26 at a speed substantially slower than the normal operating speed. The slow operational speed is necessary when sharpening or lapping the reel blades. With the switch 90 in the mow position, the motors operate at conventional operational speeds.

With the alternator output off so the motors 22–26 are not operating the cutting reels 12–16, the control 72 signals the regulator 46 to turn on the motors if signals from the interlocks 76 and operator control interface 80 indicate operating conditions are present (i.e., the operator is positioned properly, brake and/or gear position is correct, the reels are lowered to operating positions and reel engagement is selected by the operator). The regulator applies a DC voltage across the field input terminals 40 and 42 to bring up the output voltage across the output terminals 30 and 32 so the motors 22, 24 and 26 rotate the reels 12, 14 and 16. The field excitation voltage is controlled by the control 72 and regulator 46 so that the output voltage across the terminals 30 and 32 brought up gradually rather than abruptly stepped up and a smooth start up is achieved. When the output voltage as sensed by the line 60 reaches the selected operating level, the regulator circuit 48 modulates the field excitation power to maintain a generally constant speed/output voltage. The speed/voltage can be easily adjusted at the operator control interface 80 to suit particular operating conditions and operator preferences.

A zener 102 diode is connected in series with a light emitting diode (LED) 104 between the positive and negative field terminals 40 and 42. The reverse zener breakdown voltage is selected to be approximately the maximum desired field excitation voltage, which is on the order of the nominal voltage of the source 56. If the field voltage exceeds the desired level, the LED will provide a visual signal of an over-voltage condition.

Having described the preferred embodiment, it will become apparent that various modifications can be made without departing from the scope of the invention as defined in the accompanying claims.

What is claimed is:

1. A control system for controlling the operation of an electric motor driving a working element on an implement, the control system comprising:

an alternator having output terminals connected to the electric motor and a field excitation input for receiving a voltage signal, the alternator providing an output voltage level dependent on the voltage signal at the field excitation input;

a voltage regulator connected to the field excitation input;

a control connected to the voltage regulator for controlling the voltage signal at the field excitation input, the voltage signal being substantially lower than a maximum output voltage level at the alternator output terminals; and wherein the control provides both switching of the alternator to switch the electric motor on and off via the field excitation input so that arcing and high voltage transients are eliminated and, when the electric motor is switched on, the control regulates the field excitation voltage to maintain a preselected alternator output level.

2. The control system as set forth in claim 1 including an implement interlock connected to the controller and providing implement condition signals, wherein the voltage regulator is responsive to implement condition signals to control the voltage signal in dependence on implement condition.

3. The control system as set forth in claim 1 wherein the control provides a gradual increase of voltage at the field excitation input when the electric motor is switched on.

4. The control system as set forth in claim 1 wherein the voltage to the electric motor is controlled exclusively through control of the field excitation input.

5. The control system as set forth in claim 1 including a switch connected to the voltage regulator and having a first position to establish a first slow speed for servicing the working element and a second position facilitating high speed motor operation for normal operation of the working element.

6. The control system as set forth in claim 1 wherein the implement comprises a mower and the working element comprises a mower cutting element.

7. The control system as set forth in claim 2 including an implement interlock connected to the controller and providing implement condition signals, wherein the voltage regulator is responsive to implement condition signals to control the voltage signal in dependence on implement condition.

* * * * *